(12) United States Patent
Koyama et al.

(10) Patent No.: US 10,937,217 B2
(45) Date of Patent: Mar. 2, 2021

(54) ELECTRONIC DEVICE AND CONTROL METHOD THEREOF FOR GENERATING EDITED VR CONTENT

(71) Applicant: CANON KABUSHIKI KAISHA, Tokyo (JP)

(72) Inventors: Jun Koyama, Tokorozawa (JP); Koki Kitaya, Kawasaki (JP); Shin Murakami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/725,963

(22) Filed: Dec. 23, 2019

(65) Prior Publication Data

US 2020/0211246 A1  Jul. 2, 2020

(30) Foreign Application Priority Data

Dec. 28, 2018 (JP) .............................. JP2018-248283
Dec. 28, 2018 (JP) .............................. JP2018-248299

(51) Int. Cl.
*G06T 11/60* (2006.01)
*G06F 3/0485* (2013.01)
*G06F 3/0488* (2013.01)

(52) U.S. Cl.
CPC ............ *G06T 11/60* (2013.01); *G06F 3/0485* (2013.01); *G06F 3/04883* (2013.01)

(58) Field of Classification Search
CPC .... G06T 11/60; G06F 3/0485; G06F 3/04883; G06F 3/0488; G06F 3/04845
See application file for complete search history.

(56) References Cited

U.S. PATENT DOCUMENTS

| 5,796,426 A * | 8/1998 | Gullichsen | G06T 3/0018 348/147 |
| 2009/0295789 A1* | 12/2009 | Yao | H04N 1/0044 345/418 |
| 2016/0119551 A1* | 4/2016 | Brown | G06T 3/0062 345/646 |
| 2018/0121069 A1* | 5/2018 | DiVerdi | G06T 11/60 |
| 2018/0220071 A1* | 8/2018 | Oshima | H04N 5/2624 |

FOREIGN PATENT DOCUMENTS

| JP | 2014-165523 A | 9/2014 |
| JP | 2016-123127 A | 7/2016 |

* cited by examiner

*Primary Examiner* — Maurice L. McDowell, Jr.
(74) *Attorney, Agent, or Firm* — Cowan, Liebowitz & Latman, P.C.

(57) ABSTRACT

An electronic device includes a control unit to control so that cyclical scroll display of a same content is performed on the second screen, the cyclical scroll display involving, in accordance with a first operation, scrolling the VR content being displayed by flat display in a first direction without scrolling the indicator and sequentially displaying, in the first direction from an end in a second direction in the rectangular region, an image region corresponding to a scroll amount in the first direction among the VR content, and that the cyclical scroll display is not performed on the first screen even when the first operation is performed; and a generating unit to generate an edited VR content including a second video range that is narrower than the first video range among the VR content on the basis of a region indicated by the indicator.

17 Claims, 10 Drawing Sheets

ELECTRONIC DEVICE AND CONTROL METHOD THEREOF FOR GENERATING EDITED VR CONTENT

BACKGROUND OF THE INVENTION

Field of the Invention

The present invention relates to an electronic device and a control method thereof.

Description of the Related Art

In recent years, image capturing apparatuses capable of photographing a VR (Virtual Reality) image containing a video with a wider range than a human viewing angle such as an omnidirectional image or a fully celestial image are becoming popular. On the other hand, an image format specialized for forward 180 degrees has been introduced, and demands for clipping a 180-degree image from a VR image are growing.

Japanese Patent Application Laid-open No. 2016-123127 proposes a method of extracting a partial region on which a touch operation has been performed of a VR image, performing distortion correction, and displaying the corrected partial region in superposition on a screen.

Japanese Patent Application Laid-open No. 2014-165523 proposes a method of designating a setting of a clipping region of an image by either changing a size of a clipping frame or by changing a magnification of the image while keeping the clipping frame fixed.

When clipping a 180-degree clipping region from a VR image, a user can panoramically view the entire VR image by performing flat display in which a 360-degree valid video range is fitted into a rectangle. However, in case of designating a 180-degree clipping region in the state of flat display, there is a problem in that designating an end region on the flat display as a clipping center is difficult.

SUMMARY OF THE INVENTION

In consideration of the above, an object of the present invention is to provide an electronic device and a control method thereof which enable, in case of clipping a VR image with a narrower range from the VR image on flat display, a region near an end of a screen of the flat display to be designated as a clipping center.

In order to solve the problem described above, an electronic device of the present invention includes at least one memory and at least one processor which function as: a display controlling unit configured to control so that flat display involving fitting a first video range of a VR content into a rectangle is performed on a first screen and an indicator indicating a region to be clipped from the VR content is displayed on the VR content being displayed by flat display in a rectangular region on a second screen; a switching unit configured to switch the first screen to the second screen in accordance with a setting instruction of a clipping range from a user; a control unit configured to control so that cyclical scroll display of a same content is performed on the second screen, the cyclical scroll display involving, in accordance with a first operation, scrolling the VR content being displayed by flat display in a first direction without scrolling the indicator and, in accordance with the scrolling of the VR content, sequentially displaying, in the first direction from an end in a second direction that is an opposite direction to the first direction in the rectangular region, an image region corresponding to a scroll amount in the first direction among the VR content, and that the cyclical scroll display is not performed on the first screen even when the first operation is performed; and a generating unit configured to generate an edited VR content including a second video range that is narrower than the first video range among the VR content on the basis of a region indicated by the indicator on the second screen.

Further features of the present invention will become apparent from the following description of exemplary embodiments with reference to the attached drawings.

DESCRIPTION OF THE EMBODIMENTS

Figure 1:
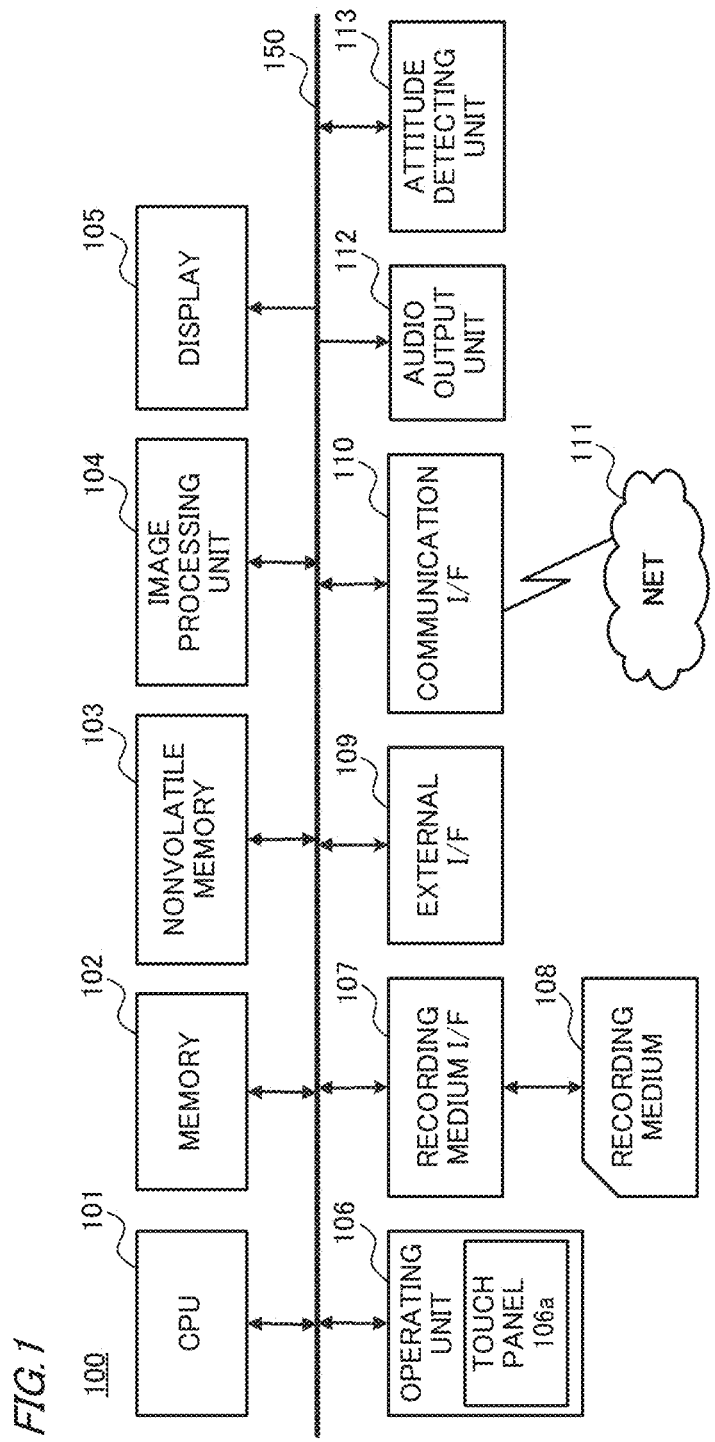
FIG. 1 is a block diagram of a display control apparatus.

Hereinafter, a preferred embodiment of the present invention will be described with reference to the drawings. FIG. 1 is a block diagram showing a configuration example of a display control apparatus 100 as an example of the electronic device. A CPU 101, a memory 102, a nonvolatile memory 103, an image processing unit 104, a display 105, an operating unit 106, a recording medium I/F 107, an external I/F 109, and a communication I/F 110 are connected to an internal bus 150. In addition, an audio output unit 112 and an attitude detecting unit 113 are also connected to the internal bus 150. The respective units connected to the internal bus 150 are configured so as to be capable of exchanging data with one another via the internal bus 150.

The CPU 101 is a control unit which controls the entire display control apparatus 100 and is constituted by at least one processor or one circuit. The memory 102 is constituted by, for example, a RAM (such as a volatile memory using a semiconductor element). The CPU 101 controls the respective units of the display control apparatus 100 by, for example, using the memory 102 as a work memory in accordance with a program stored in the nonvolatile memory 103. The nonvolatile memory 103 stores image data and audio data, other data, various programs that enable the CPU 101 to operate, and the like. The nonvolatile memory 103 is constituted by, for example, a flash memory or a ROM. The CPU 101 executes processes of respective units included in the display control apparatus 100, namely, a display controlling unit, a control unit, a generating unit, and a boundary display unit.

Under control by the CPU 101, the image processing unit 104 performs various types of image processing on images stored in the nonvolatile memory 103 or a recording medium 108, video signals acquired via the external I/F 109, images acquired via the communication I/F 110, and the like. Image processing performed by the image processing unit 104 includes an A/D conversion process and a D/A conversion process as well as an encoding process, a compression process, a decoding process, an enlargement/reduction process (resizing), a noise reduction process, a color conversion process, and the like of image data. The image processing unit 104 also performs various types of image processing such as panoramic development, a mapping process, and conversion of omnidirectional images or VR images being wide-range images having video of a wide range although not omnidirectional. The image processing unit 104 may be constituted by a dedicated circuit block for performing specific image processing. In addition, depending on a type of image processing, the CPU 101 may perform the image processing in accordance with a program without using the image processing unit 104.

The display 105 displays images, a GUI (Graphical User Interface) screen constituting a GUI, and the like under control by the CPU 101. The CPU 101 controls the respective units of the display control apparatus 100 so as to generate a display control signal in accordance with the program and to generate a video signal to be displayed on the display 105 and output the video signal to the display 105. The display 105 displays a video on the basis of a generated and output video signal. Alternatively, components of the display control apparatus itself may be limited to up to an interface for outputting a video signal to be displayed by the display 105, and the display 105 may be constituted by an external monitor (such as a television or an HMD).

The operating unit 106 is an input device for accepting a user operation of which examples include a character information input device such as a keyboard, a pointing device such as a mouse or a touch panel, a button, a dial, a joystick, a touch sensor, and a touch pad. In this case, a touch panel 106a is an input device which is planarly configured so as to overlap with the display 105 and to output coordinate information in accordance with a touched position.

The recording medium 108 that is a memory card, a CD, a DVD, or the like is mountable to and dismountable from the recording medium I/F 107. Under control by the CPU 101, the recording medium IF 107 reads data from and writes data to the mounted recording medium 108. The external I/F 109 is an interface to be connected to an external device using a wired cable or in a wireless manner to perform input and output of video signals and audio signals. The communication I/F 110 is an interface for communicating with an external device, the Internet 111, and the like to transmit and receive various types of data such as files and commands.

The audio output unit 112 outputs audio of moving images and music data, keyboard clicks, ring tones, various notification sounds, and the like. While it is assumed that the audio output unit 112 includes an audio output terminal 112a (to be described later) to which an earphone or the like is to be connected and a speaker 112b (to be described later), alternatively, the audio output unit 112 may output audio data to an external speaker by radio communication or the like.

The attitude detecting unit 113 detects an attitude (a tilt) of the display control apparatus 100 relative to a direction of gravitational force or an attitude of the display control apparatus 100 relative to respective axes in a yaw direction, a pitch direction, and a roll direction. On the basis of an attitude detected by the attitude detecting unit 113, a determination can be made as to whether the display control apparatus 100 is being held horizontally, held vertically, pointed upward, pointed downward, or assuming an oblique attitude. In addition, a determination can be made as to a presence or absence or a magnitude of a tilt of the display control apparatus 100 in a rotation direction such as the yaw direction, the pitch direction, or the roll direction and whether or not the display control apparatus 100 has rotated in the rotation direction. One of an acceleration sensor, a gyro sensor, a geomagnetic sensor, an orientation sensor, an altitude sensor, and the like or a combination of a plurality of these sensors can be used as the attitude detecting unit 113.

The operating unit 106 includes the touch panel 106a. The CPU 101 is capable of detecting the following operations with respect to the touch panel 106a or the following states of the touch panel 106a.

- A state where a finger or a stylus previously not in touch with the touch panel 106a newly touches the touch panel 106a or, in other words, a start of a touch (hereinafter referred to as a touch-down)
- A state where the touch panel 106a is being touched by a finger or a stylus (hereinafter referred to as a touch-on)
- A state where a finger or a stylus is moving while in touch with the touch panel 106a (hereinafter referred to as a touch-move)
- A state where a finger or a stylus previously in touch with the touch panel 106a separates from the touch panel 106a or, in other words, an end of a touch (hereinafter referred to as a touch-up)
- A state where nothing is touching the touch panel 106a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The CPU 101 is notified of the operations or the states described above as well as position coordinates where a finger or a stylus is touching the touch panel 106a through an internal bus and, on the basis of the notified information, the CPU 101 determines what kind of operation (touch operation) has been performed on the touch panel 106a. With respect to a touch-move, a movement direction of a finger or a stylus moving on the touch panel 106a can also be determined for each of a vertical component and a horizontal component on the touch panel 106a on the basis of a change in the position coordinate. It is assumed that a determination that a slide operation has been performed is made when a touch-move of a predetermined distance or more is detected.

An operation involving quickly moving a finger on the touch panel 106a over a certain distance while keeping the finger in touch with the touch panel 106a and then releasing the finger is referred to as a flick. In other words, a flick is an operation in which a finger quickly traces the touch panel 106a as though flicking on the touch panel 106a. A determination that a flick has been performed can be made (a determination that a flick has occurred following a slide operation can be made) when a detection of a touch-move of a predetermined distance or more at a predetermined speed or more is followed by a detection of a touch-up.

Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). As the touch panel 106a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

Figure 2:
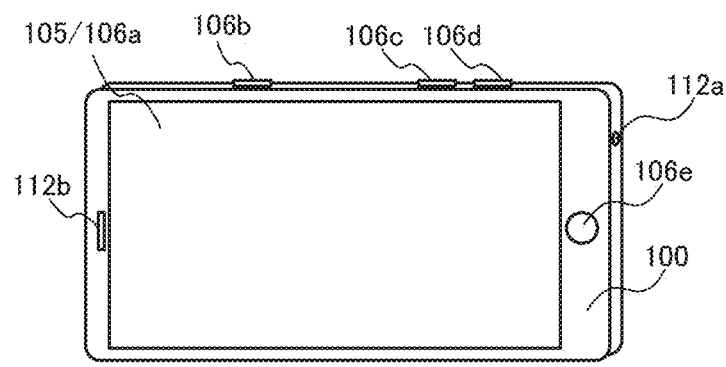
FIG. 2 is an external view of the display control apparatus.

FIG. 2 is an external view of the display control apparatus 100 which is an example of the electronic device. The display control apparatus 100 is a display apparatus such as a smartphone. A display 105 is a display unit which displays images and various types of information. The display 105 is integrally constructed with the touch panel 106a and is configured so as to be capable of detecting a touch operation on a display surface of the display 105. The display control apparatus 100 is capable of performing VR display of a VR image (a VR content) on the display 105. For example, a VR image picked up by a digital camera (an omnidirectional camera; a fully celestial camera) can be acquired via the communication I/F 110 (a VR image transferred by wireless communication can be received) and recorded in the recording medium 108. VR display (display in a VR view) of VR images recorded in the recording medium 108 in this manner can be performed on the display 105. Alternatively, VR display (display in a VR view) can be performed on the display 105 by directly connecting a recording medium on which a VR image picked up by a digital camera is recorded to the recording medium I/F 107, reading the VR image from the recording medium, and playing back the read VR image. Alternatively, VR display can be performed by acquiring, via an SNS or the like, a VR image (a shared VR image) recorded on a server apparatus or the like connected to a network. In the present embodiment, the operating unit 106 includes the touch panel 106a and operating units 106b, 106c, 106d, and 106e. The operating unit 106b is a power supply button for accepting an operation to switch between turning a power supply of the display control apparatus 100 on and off. The operating unit 106c and the operating unit 106d are volume buttons for increasing and reducing a volume of audio output from the audio output unit 112. The operating unit 106e is a home button for causing a home screen to be displayed on the display 105. The audio output terminal 112a is an earphone jack that is a terminal for outputting an audio signal to an earphone, an external speaker, or the like. The speaker 112b is a speaker built into a main body for outputting audio.

The display control apparatus 100 is capable of performing VR display of a VR image (a VR content) on the display 105. A VR image is assumed to be an image of which VR display (display in a "VR view" display mode) can be performed. VR images are assumed to include an omnidirectional image (a fully celestial image) picked up by an omnidirectional camera (a fully celestial camera) and a panoramic image having a wider video range (a wider valid video range) than a display range that can be displayed at one time on the display unit. VR images include moving images and live view images (images acquired approximately in real time from a camera) in addition to still images. A VR image has a maximum video range (a maximum valid video range) corresponding to a visual field of 360 degrees in a vertical direction (a vertical angle, an angle from a zenith, an elevation, a depression angle, an elevation angle, or a pitch angle) and 360 degrees in a horizontal direction (a horizontal angle, an azimuth, or a yaw angle). In addition, it is assumed that VR images include images with a wider angle of view (a wider visual field range) than an angle of view that can be photographed by an ordinary camera or images with a wider video range (a wider valid video range) than a display range that can be displayed at one time on the display unit even when the visual field of the images is less than 360 degrees in the vertical direction and less than 360 degrees in the horizontal direction. For example, an image photographed by a fully celestial camera capable of photographing a subject corresponding to a visual field (an angle of view) of 360 degrees in the horizontal direction (a horizontal angle or an azimuth) and 210 degrees in the vertical direction centered on a zenith is a type of a VR image. In addition, for example, an image photographed by a camera capable of photographing a subject corresponding to a visual field (an angle of view) of 180 degrees in the horizontal direction (a horizontal angle or an azimuth) and 180 degrees in the vertical direction centered on the horizontal direction is a type of a VR image. In other words, an image having a video range corresponding to a field of view of 160 degrees (±80 degrees) or more in both the vertical direction and the horizontal direction and having a video range that is wider than a range that can be visually recognized at one time by a human being is a type of a VR image. By performing VR display (display in the "VR view" display mode) of the VR image, changing an attitude of a display apparatus (a display apparatus for displaying the VR image) in a horizontal rotation direction enables an omnidirectional video without any seams in the horizontal direction (the horizontal rotation direction) to be viewed. In the vertical direction (a vertical rotation direction), although an omnidirectional video without any seams can be viewed in a range of ±105 degrees with respect to directly above (the zenith), a range exceeding 105 degrees from directly above becomes a blank region in which a video is not present. A VR image can be described as "an image of which a video range is at least a part of a virtual space (a VR space)".

VR display (a VR view) refers to a display method (a display mode) of displaying a video of a visual field range in accordance with an attitude of the display apparatus among a VR image and in which a display range can be changed. When wearing and viewing a head mounted display (HMD) that is a display apparatus, a video of a visual field range in accordance with an orientation of the head of the user is to be displayed. For example, let us assume that a video with a viewing angle (an angle of view) centered on 0 degrees in the horizontal direction (a specific orientation such as north) and 90 degrees in the vertical direction (90 degrees from the zenith or, in other words, horizontal) at a certain point in time among a VR image is being displayed. When front and back of the attitude of the display apparatus is reversed from this state (for example, when a display surface is changed from facing south to facing north), the display range is changed to a video with a viewing angle centered on 180 degrees in the horizontal direction (an opposite orientation such as south) and 90 degrees in the vertical direction (horizontal) among the same VR image. This means that, in a case where the user is viewing the HMD, when the user turns his or her head from north to south (in other words, when the user turns around), the video displayed on the HMD also changes from a northward video to a southward video. Such a VR display enables the user to be provided with a sensation (a sense of immersion) as though the user is visually present inside the VR image (inside the VR space). A smartphone mounted to VR goggles (a head mount adapter) can be considered a type of HMD.

It should be noted that a display method of a VR image is not limited to the method described above. A configuration may be adopted in which a display range is moved (scrolled) in accordance with a user operation with respect to a touch panel, a directional button, or the like instead of an attitude change. A configuration may be adopted in which, even when a VR image is displayed by VR display (displayed in the "VR view" display mode), a display range can be changed in accordance with a touch-move with respect to the touch panel, a drag operation with respect to a mouse or the like, a depression of a directional button, or the like in addition to changing the display range in accordance with an attitude change.

In the present embodiment, an operation and a process of clipping a VR image with a video range (a valid video range) corresponding to a field of view of 180 degrees in both the vertical direction and the horizontal direction from a VR image with a video range (a valid video range) corresponding to a maximum field of view of 360 degrees in both the vertical direction and the horizontal direction will be described. It should be noted that, in the following description, a VR image with a video range (a valid video range) corresponding to a maximum field of view of 360 degrees in both the vertical direction and the horizontal direction will be referred to as a 360-degree VR image. In addition, a VR image with a video range (a valid video range) corresponding to a field of view of 180 degrees in both the vertical direction and the horizontal direction will be referred to as a 180-degree VR image. Conceptually, the process of clipping a 180-degree VR image from a 360-degree VR image is a process of clipping a hemisphere from a virtual sphere onto which a video corresponding to 360 degrees has been entirely mapped. Clipping as described in the present embodiment is not a process of clipping an ordinary rectangular image (a planar image) but, rather, a process of clipping an image that can be viewed as a VR image (an image that can be mapped onto a sphere and viewed in a VR view) even after the clipping. Since the image after the clipping has a valid video range corresponding to a field of view of 180 degrees in both the vertical direction and the horizontal direction, when the image after the clipping is mapped onto a sphere, a valid video (such as a photographed image) corresponding to a hemisphere is to be mapped. The remaining hemisphere becomes an invalid video range to be filled in monochrome or by a predetermined pattern or onto which some kind of complemented video is mapped. When viewing such a clipped VR image in a VR view, the user can visually recognize the image in a forward range with a width of 180 degrees (a range of 90 degrees in both the vertical direction and the horizontal direction from center). Reasons for performing such a clipping process include the following.

First, a data amount of an image can be reduced. A clipped 180-degree VR image has a smaller data amount than a 360-degree VR image. Therefore, capacity of a recording medium for saving VR images can be prevented from becoming oppressed. In addition, an amount of communication data during transmission and reception and processing load during display can be reduced and, proportionally, effects including an improvement in processing speed or response speed and a reduction in power consumption can be produced.

Second, unnecessary subjects can be deleted. For example, in most cases where a VR image having a valid video range corresponding to a field of view of 360 degrees is picked up, it is unavoidable that the photographer himself/herself is included in the VR image. However, in a case where an object that the photographer wishes to photograph is a landscape or the like and not the photographer himself/herself, the photographer himself/herself is an unnecessary subject and constitutes an unintentional presence. The inclusion of an unintentional video prevents a viewer from focusing his or her attention on a video such as a landscape which the photographer considers to be a theme. In addition, information to be concealed such as the face of a passerby and the license plate of a passing vehicle is often included and, in many cases, the inclusion of such information is undesirable from the perspectives of privacy and security. By performing a clipping process to clip a range intended by the photographer and discard video of other unnecessary ranges, such problems can be avoided.

Third, a physical burden on a user viewing a VR image in a VR view can be reduced. When viewing a 360-degree VR image in a VR view, video is present even behind the user viewing the VR image. While video corresponding to forward 180 degrees can be roughly panoramically viewed by a viewer by simply turning his or her head, in order to look behind, the view must twist his or her torso or change his or her standing direction, thereby placing a relatively high physical burden on the viewer. Such a body movement to look behind is unsuitable for viewing when seated unless the viewer is in a swivel chair. In comparison, since a 180-degree VR image can be roughly panoramically viewed by simply turning one's head, the physical burden placed on the viewer when viewing the VR image is relatively small. If the viewer is made aware of the fact that a VR image is a 180-degree VR image by a guide display or a display indicating that a range exceeding 180 degrees is an invalid region, the viewer does not even attempt to look behind. Therefore, the viewer can be prevented from being forced to perform a body movement such as looking behind.

Fourth, a 360-degree VR image can be displayed in accordance with a recording format for a 180-degree VR image or the like. When a recording format of a 360-degree VR image differs from the recording format for a 180-degree VR image, the 360-degree VR image cannot be viewed by a reproducing apparatus (reproduction application software) which only supports viewing 180-degree VR images. However, generating a 180-degree VR image by clipping the 180-degree VR image from a 360-degree VR image enables the VR image to be viewed by a reproducing apparatus which only supports viewing 180-degree VR images. In addition, in a case where both viewing 180-degree VR images and viewing 360-degree VR images are supported, switching operations for switching between a mode for viewing 180-degree VR images and a mode for viewing 360-degree VR images must be performed, switching operations may be a hassle. However, generating a 180-degree VR image by clipping the 180-degree VR image from a 360-degree VR image enables a plurality of VR images to be switched and viewed in succession without having to switch to the display mode for 180-degree VR images. Furthermore, a display mode (a binocular VR view) is envisaged which displays two 180-degree VR images including a right-eye 180-degree VR image and a left-eye 180-degree VR image photographed by two camera units installed facing a subject in a same direction and separated by a distance corresponding to parallax in such a manner that the two 180-degree VR images can be stereoscopically viewed. By clipping a right-eye 180-degree VR image and a left-eye 180-degree VR image from a 360-degree VR image and recording the 180-degree VR images in advance, the 180-degree VR images can also be viewed in such a binocular VR view.

While an example in which a 180-degree VR image is generated by clipping the 180-degree VR image from a 360-degree VR image will be described in the present embodiment, the present embodiment is also applicable to processes for VR images with other viewing angles as long the processes are for clipping a VR image with a valid video range that is narrower than a valid video range of the VR image prior to the clipping. In other words, the VR image prior to clipping is not limited to a 360-degree VR image and the VR image after the clipping is not limited to a 180-degree VR image.

In each process described below, an example of advancing the process by displaying various touch buttons and accepting a touch operation with respect to the various touch buttons as a user operation will be described. Specifically, a touch operation of accepting an instruction with respect to various touch buttons may be a touch-up from a touch response region corresponding to a touch button or a touch-down with respect to a touch response region corresponding to a touch button. In addition, each instruction described as an instruction to be accepted by an operation to a touch button to be described later is not limited thereto and may be accepted by other user operations. For example, a user operation for accepting an instruction may be an operation with respect to each physical button, an operation of selecting a display item using a direction key and depressing an enter key, an operation of selecting a display item using a mouse, a voice command, or the like.

Hereinafter, operations of a practical example of the present invention will be described with reference to FIGS. 3 to 8A to 8E.

Figure 3:
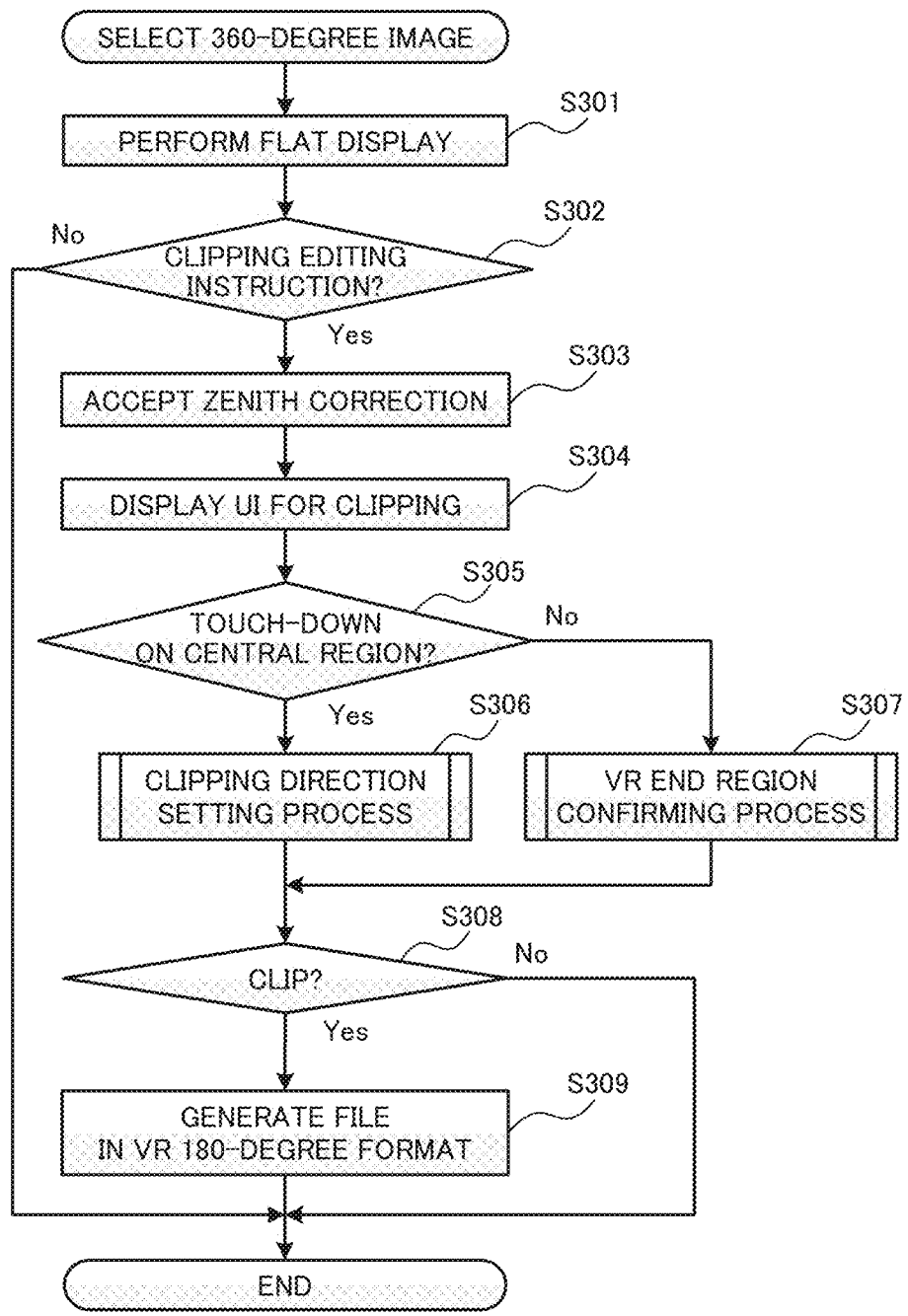
FIG. 3 is a flow chart showing a clipping process from a VR image to a 180-degree image.

FIG. 3 is a flow chart showing an example of a clipping process from a 360-degree VR image to a 180-degree image by the display control apparatus 100. The processes of this flow chart are realized as the CPU 101 deploys a program stored in the nonvolatile memory 103 on the memory 102 and executes the program.

The processes shown in FIG. 3 may be started when a power supply of the display control apparatus 100 is turned on and a VR image (a VR content) is selected from images recorded on the recording medium 108 and images acquired from a communication destination.

In S301, the CPU 101 loads a VR image to be a display object from the recording medium 108 or a communication destination via the communication I/F 110. The CPU 101 acquires information indicating a video range (a valid video range) attached as attribute information of the VR image, and displays the VR image by flat display in which the valid video range is fitted into a rectangle. The valid video range of the VR image subjected to flat display on the display 105 in S301 is an example of the first valid video range. While a VR image is displayed by mapping the VR image onto a virtual sphere in a VR view, in flat display, the VR image is displayed by fitting the entire VR image into a rectangle by equidistant cylindrical projection or the like. Therefore, in portions near ends of the rectangle and the like, a subject is more distorted than when the subject is displayed in a VR view.

The information indicating a valid video range refers to information describing angular ranges in the vertical direction and in the horizontal direction of a valid video included in the VR image. The information indicating a valid video range may be information that enables a valid video range of the VR image to be specified and may be angle information represented by an angle of view, a viewing angle, an azimuth, an elevation, a depression angle, an elevation angle, a steradian, or the like or positional information such as the numbers of vertical and horizontal pixels or coordinates.

Alternatively, the information indicating a valid video range may be model information of the camera used to capture the VR image (a photographable range can be specified by specifying a model), information on zoom during photography, and the like. When the CPU 101 acquires the information indicating a valid video range, the CPU 101 also identifies (calculates) an invalid video range (a non-video range) based on differences from vertical and horizontal 360 degrees. Conversely, information indicating an invalid video range may be acquired from the attribute information of the VR image and a valid video range may be calculated from the information indicating the invalid video range, or both information indicating a valid video range and information indicating an invalid video range may be acquired from the attribute information of the VR image.

Figure 6A:
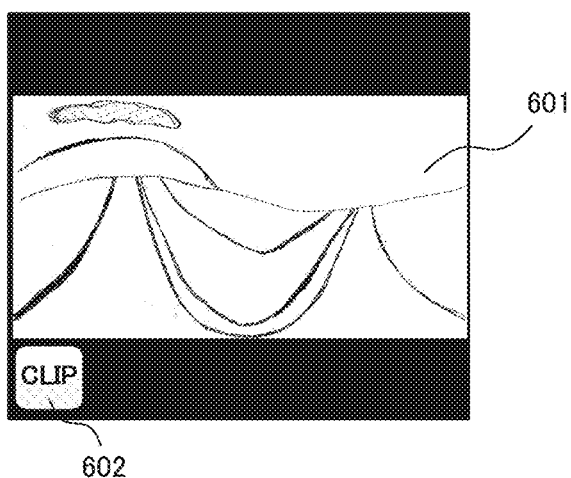
FIGS. 6A to 6C represent display examples when performing a clipping process from a VR image to a 180-degree image.

FIG. 6A shows a display example (a display example on a first screen) of flat display in S301. Since the image uses equidistant cylindrical projection, unlike the actual subject, the image is distorted. The user can make a transition to a clipping mode of a VR image 601 by a button operation involving selecting a clipping button 602. The clipping button 602 is an operation button for accepting an instruction for setting a clipping range from the user. In addition, an instruction icon for making a transition to a VR view may be displayed. In accordance with an operation with respect to the instruction icon, a transition can be made from flat display to a VR view with respect to a same image. It should be noted that, when a touch-move is performed on a display region of the VR image 601 during the flat display in S301, it is assumed that the VR image 601 is switched to another image (switched to display of a next image or a previous image in a predetermined order such as an order of file names). The flat display in S301 is a screen used by the user to identify an image to be a display object or an editing object. When images are to be switched by a touch-move, while the VR image 601 is slid (scrolled) in a direction of the touch-move so as to follow the touch-move, a non-image region colored in black or the like or an image after the switch is displayed on an outer side of ends of the VR image 601 shown in FIG. 6A. In other words, unlike a scroll in a clipping direction setting process shown in FIG. 4, a cyclical scroll that prevents ends from being identified is not performed.

In S302, the CPU 101 determines whether or not a touch operation with respect to the clipping button 602 has been performed or, in other words, whether or not an instruction to set a clipping range with respect to the touch panel 106a has been issued. When an instruction to set a clipping range has been issued, the CPU 101 advances to S303, but in a case where an instruction to set a clipping range has not been issued, the CPU 101 ends the process. When the CPU 101 advances to S303, a transition is made to a mode of setting a clipping range for clipping the VR image at 180 degrees.

Figure 6B:
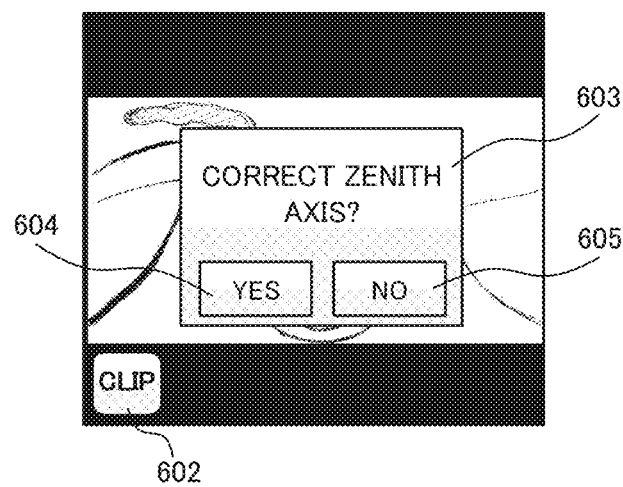

In S303, the CPU 101 displays a selection screen for selecting whether or not to perform zenith correction, receives a parameter related to zenith correction having been input to the touch panel 106a, and performs zenith correction when it is desired to do so. FIG. 6B shows a display example of the selection screen for selecting whether or not to perform zenith correction which is displayed in S303. A zenith correction selection dialog 603 shown in FIG. 6B is displayed by performing a button operation of selecting the clipping button 602. The zenith correction selection dialog 603 includes a button 604 and a button 605. In accordance with a button operation by the user of selecting the button 604, correction of a zenith axis is executed before the clipping process of the VR image. Alternatively, when the button 605 is selected, correction of the zenith axis is not executed before the clipping process of the VR image.

Figure 6C:
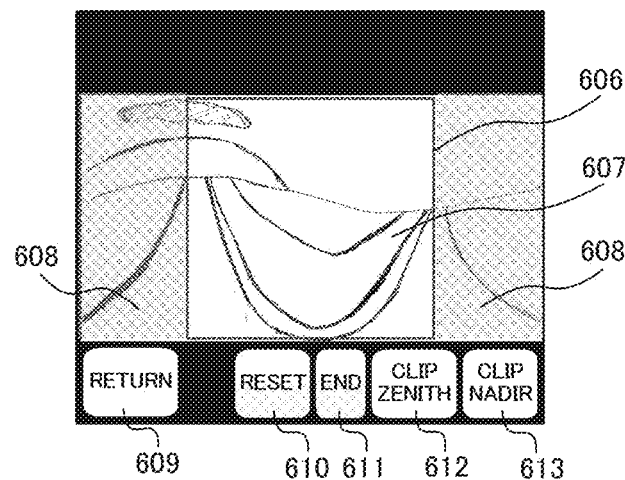

In S304, the CPU 101 displays a UI for clipping on the display 105. In other words, in accordance with the instruction to set a clipping range from the user, the display screen described in S301 is switched to a UI screen for clipping (switching control). FIG. 6C shows a display example of the UI for clipping (a display example of a second screen) which is displayed in S304. A clipping region frame 606 is an indicator that indicates a 180-degree region to be clipped from the VR image. The clipping region frame 606 is displayed on the VR image (on the VR content) being displayed by flat display in a rectangular region. It should be noted that the clipping region frame 606 does not particularly indicate an accurate clipping range and merely indicates a rough range. A non-clipping region 608 indicates a region not included in the 180-degree region to be clipped.

A button operation of selecting a clipping determination (completion) button 611 by the user causes a clipping region 607 enclosed by the clipping region frame 606 to be set as the clipping region. A button operation of selecting a zenith clipping button 612 causes a 180-degree region centered on a zenith direction (an upward direction of the VR content) to be set as the clipping region. A button operation of selecting a nadir clipping button 613 causes a 180-degree region centered on a nadir direction (a downward direction of the VR content) to be set as the clipping region. A button operation of a return button 609 causes a screen of flat display in FIG. 6A to be displayed. On the basis of the set clipping region, the CPU 101 can generate an edited VR content having a valid video range that is narrower than the valid video range prior to clipping. In this manner, the CPU 101 does not scroll a VR content in the vertical direction, and clipping of the VR content in the vertical direction is performed by a button operation (an operation not involving a scrolling operation) by the user.

In S305, the CPU 101 determines whether or not a touch-down has been detected with respect to a central region on an inner side of the clipping region 607 among a display region of the VR image being displayed by flat display on the display 105. The central region on the inner side of the clipping region 607 is a region on an inner side by a predetermined width or more of left and right portion of the clipping region frame 606 which represent left and right boundaries of the clipping region 607. When a touch-down with respect to the central region is detected, the CPU 101 advances to S306, but in a case where a touch-down with respect to the central region is not detected, the CPU 101 advances to S307.

In S306, the CPU 101 performs the clipping direction setting process. It should be noted that the clipping direction (a range of the image to be clipped) is set on the basis of the region enclosed by the clipping region frame 606 shown in FIG. 6C. The valid video range of the region to be clipped is an example of the second valid video range. The CPU 101 performs control such that at least a center of the region enclosed by the clipping region frame 606 shown in FIG. 6C and a center of the actual valid video range to be clipped (the second valid video range) coincide or approximately coincide with each other. However, since the clipping region frame 606 shown superimposed on the flat display does not accurately express a clipping boundary of a hemisphere, the range indicated by the clipping region frame 606 and the actual valid video range to be clipped (the second valid video range) do not completely coincide with each other. For example, the range of the region enclosed by the clipping region frame 606 may be made larger than the actual valid video range (180 degrees) to be clipped. The clipping direction setting process will be described later with reference to FIG. 4.

In S307, the CPU 101 performs a VR end region confirming process. The VR end region confirming process will be described later with reference to FIG. 5.

In S308, the CPU 101 determines whether or not a touch operation with respect to the clipping determination button 611 has been performed or, in other words, whether or not a clipping instruction has been issued. When a clipping instruction has been issued, the CPU 101 advances to S309, but in a case where a clipping instruction has not been issued, the CPU 101 ends the process.

In S309, the CPU 101 clips an image in a range of 180 degrees in the clipping direction set in S306 and saves the clipped image in a VR 180-degree format in the recording medium 108. In other words, the CPU 101 records the clipped VR image in the recording medium 108.

Figure 10A:
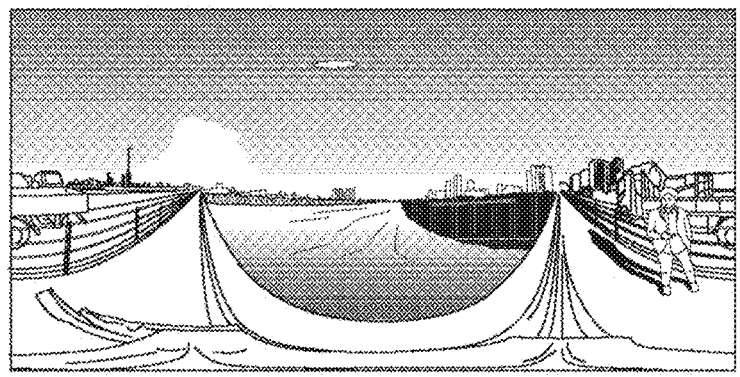
FIGS. 10A to 10D represent examples of various ways to display a VR image.
Figure 10B:
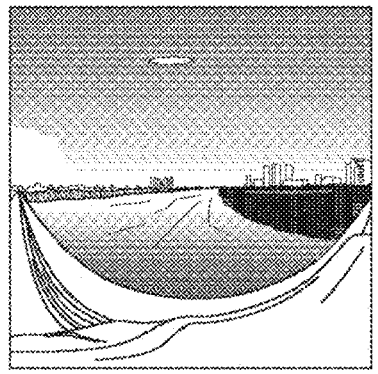
Figure 10C:
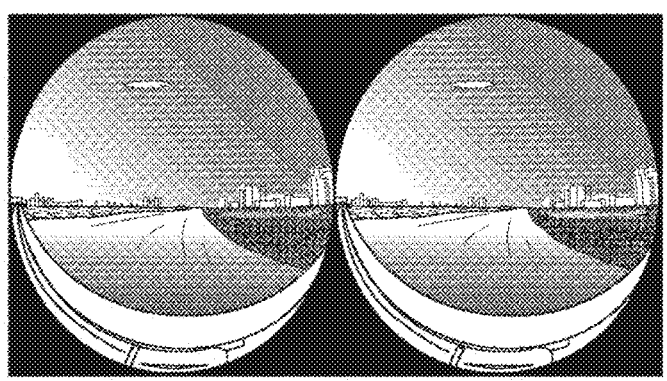
Figure 10D:
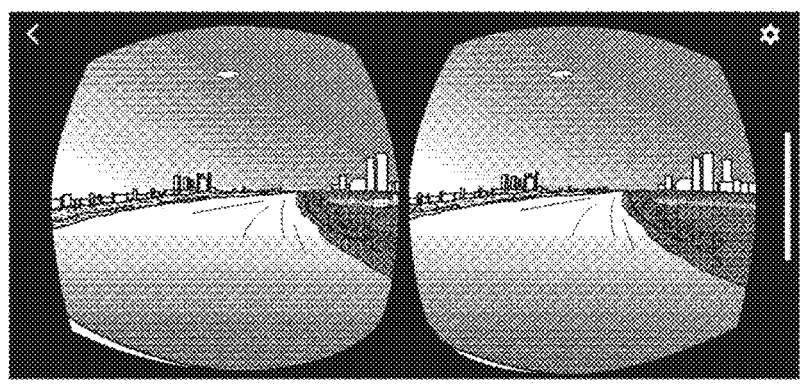

The clipped VR image (an image file that can be displayed in a VR view) to be recorded in S309 will be described. When the clipped VR image is a still image, a single file is generated and recorded, the single file storing, in a multi-picture format, a plurality of images created by deforming an image within a clipping range by equidistant cylindrical projection and fitting the deformed image into a rectangle. When a 360-degree VR image prior to clipping (an original image) is displayed as an ordinary planar image instead of a VR view, an image drawn by equidistant cylindrical projection in a rectangle such as that shown in FIG. 10A is obtained. The image is displayed in this manner in S301. When a 180-degree range is clipped from the original image by the process described with reference to FIG. 4, an image drawn by equidistant cylindrical projection in an approximate square such as that shown in FIG. 10B is recorded when the 180-degree range is displayed as an ordinary planar image instead of a VR view. In doing so, two of a same image obtained by copying the image inside the clipping range are respectively recorded in a same file as a right-eye image and a left-eye image even when there is no parallax. Alternatively, two 180-degree ranges may be clipped and generated from one 360-degree VR image prior to clipping so as to have a pseudo-parallax (in other words, so that ranges of the left-eye image and the right-eye image slightly differ from each other). For example, a file name of a VR image of a clipped still image is "123456.vr.jpg", and a character string made up of three characters ".vr"is described before the extension".jpg". When an image saved as a still image file in this manner is reproduced and displayed in a VR view, the image shown in FIG. 10B is mapped onto a hemisphere and displayed. FIG. 10D shows an example in which a VR image file of a clipped still image is reproduced and displayed in a binocular VR view (a display example on the display 105 in a state where the display 105 is not mounted on VR goggles).

When the clipped VR image is a moving image, a moving image file is generated and recorded, the moving image file having videos (moving images) obtained by mapping the image within the clipping range to the inside of a sphere or an ellipse instead of equidistant cylindrical projection arranged horizontally (side by side) inside the video of a single moving image. In doing so, two of a same image obtained by copying the image within the clipping range are respectively arranged horizontally and recorded as a right-eye image and a left-eye image even when there is no parallax. When such a moving image is displayed as an ordinary planar image instead of a VR view, the moving image is displayed as shown in FIG. 10C. Alternatively, two 180-degree ranges may be clipped and generated from one 360-degree VR image prior to clipping so as to have a pseudo-parallax (in other words, so that ranges of the left-eye image and the right-eye image slightly differ from each other). For example, a file name of a VR image of a clipped moving image is "123456.vr.mp4", and a character string made up of three characters ".vr"is described before the extension".mp4". A display example of a given frame of a VR image file of a clipped moving image when reproduced and displayed in a binocular VR view (a display example on the display 105 in a state where the display 105 is not mounted on VR goggles) is similar to the example shown in FIG. 10D.

Figure 4:
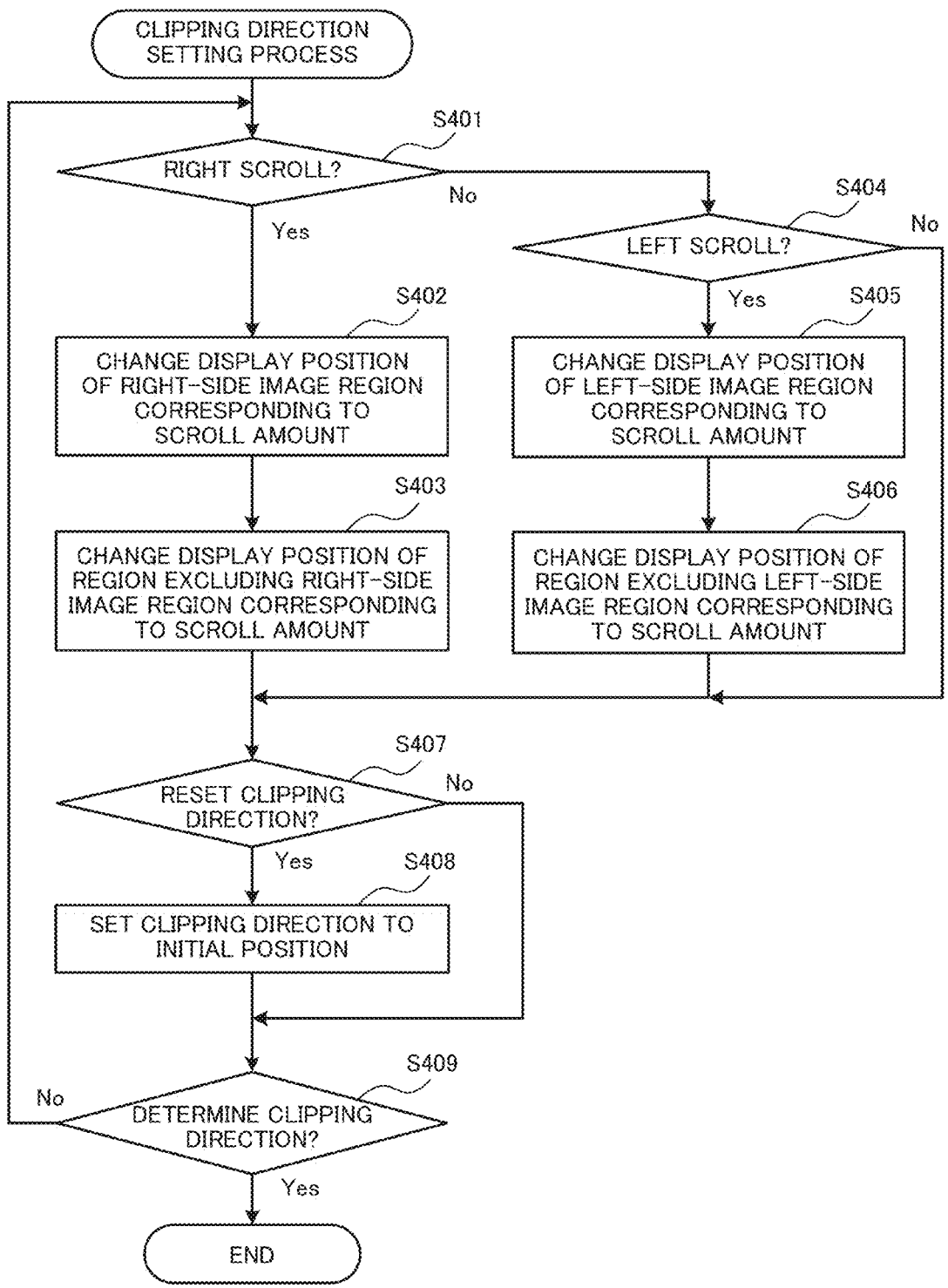
FIG. 4 is a flow chart showing a clipping direction setting process.

FIG. 4 is a flow chart showing an example of the clipping direction setting process of S306 shown in FIG. 3. The clipping direction setting process is realized as the CPU 101 deploys a program stored in the nonvolatile memory 103 on the memory 102 and executes the program.

In S401, the CPU 101 determines whether or not a right scroll has been input with respect to the touch panel 106a. The input of a right scroll is an operation of scrolling an image rightward and corresponds to a scroll instruction in a rightward direction. The input of a right scroll is, for example, a touch-move that moves to the right or an operation of sliding a scroll bar (not illustrated) toward the left. When a right scroll is input, the CPU 101 advances to S402, but in a case where a right scroll is not input, the CPU 101 advances to S404.

In S402, when the CPU 101 receives an input of a right scroll from the user, the CPU 101 scrolls (slides) the image toward the right. The CPU 101 sequentially displays an image region of the display 105 corresponding to a rightward scroll amount in accordance with the scroll from a left end of the display 105 toward the right. It should be noted that a position of the clipping region frame 606 on the screen is fixed and the position is not scrolled even when a scroll is input.

In S403, the CPU 101 displays a region on a leftward direction side excluding an image region on a right side corresponding to the scroll amount by moving the region rightward by the scroll amount. In other words, the CPU 101 scrolls the VR content displayed by flat display in the rectangular region of the display 105 rightward. In addition, in accordance with the scroll, the CPU 101 sequentially displays an image region corresponding to the rightward scroll amount in the VR content from a leftward end in an opposite direction to the rightward direction toward the right in the rectangular region.

Figure 7A:
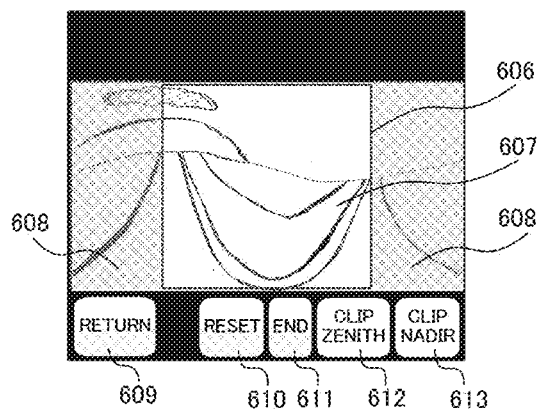
FIGS. 7A to 7E represent display examples when changing a clipping direction by a right scroll.
Figure 7B:
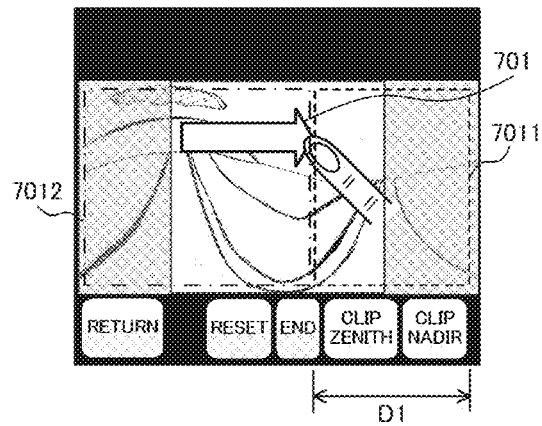

FIGS. 7A to 7E show a display example in accordance with the scrolls performed in S402 and S403. A right scroll 701 shown in FIG. 7B represents a scroll input in a rightward direction with respect to FIG. 7A. When the right scroll 701 is input, the processes of S402 and S403 shown in FIG. 4 are executed. For example, let us assume that, in S401, the user has scrolled toward the right end side of the display 105 by a scroll amount D1. In S402, the CPU 101 sequentially displays an image region 7011 which is enclosed by a dotted line and which corresponds to the scroll amount (D1) from the left end of the display 105 toward the right. Next, in S403, the CPU 101 displays a left-side region 7012 enclosed by a dashed-dotted line and excluding the image region 7011 corresponding to the scroll amount (D1) by moving the region 7012 rightward by the scroll amount (D1). Once the processes are executed, the display 105 changes to the state shown in FIG. 7C. A button operation of selecting a clipping determination (completion) button 611 by the user causes a clipping region 702 enclosed by the clipping region frame 606 to be set as the clipping region.

Figure 7C:
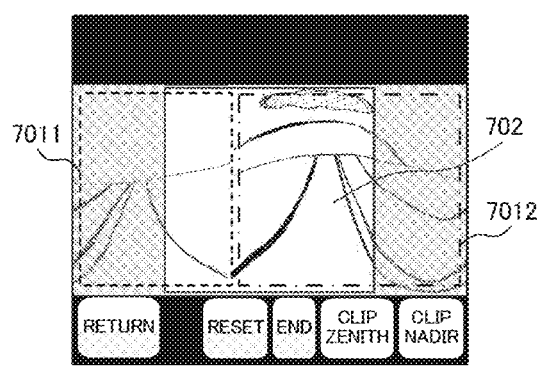
Figure 7D:
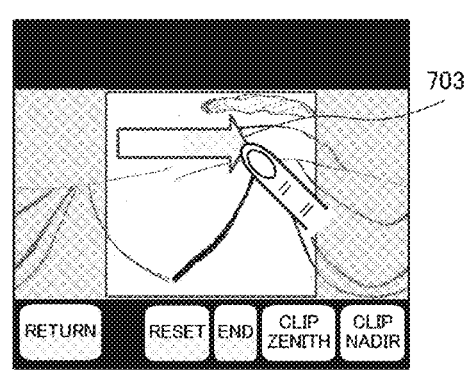
Figure 7E:
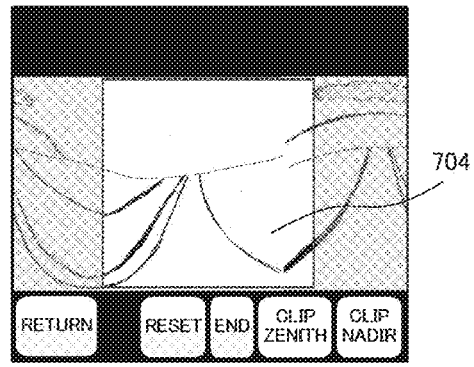

A right scroll 703 shown in FIG. 7D represents a scroll input in a rightward direction with respect to FIG. 7C. When the right scroll 703 is input, the processes of S402 and S403 shown in FIG. 4 are executed in a similar manner to when the right scroll 701 was input, and the display 105 changes to the state shown in FIG. 7E. A button operation of selecting a clipping determination (completion) button 611 by the user causes a clipping region 704 enclosed by the clipping region frame 606 to be set as the clipping region.

As described above, when the scrolls performed in S402 and S403 involve scrolling an image to the right, a portion which is scrolled all the way to outside of a right-side display region and which disappears is displayed so as to successively enter the display region from a left end thereof toward the right. In addition, an endless scroll can be realized without reaching an end by repetitively inputting right scrolls. In other words, a cyclical scroll display of a same content which does not make the user aware of boundaries such as left and right ends of the VR image 601 can be realized. Accordingly, a portion positioned at an end of the display region in the display example shown in FIG. 6A can now be positioned at the center of the clipping region frame 606. In addition, an instruction to make a seamless 180-degree region centered on the position (a range with a circumference of 90 degrees which is centered on the position) the VR image after clipping can be issued. It should be noted that, since cyclical scroll display enables an arbitrary orientation of the VR image to be designated as center, the scroll display need not be endlessly cyclical and may enable at least one cycle to be made.

In S404, the CPU 101 determines whether or not a left scroll toward an opposite side to the rightward direction has been input with respect to the touch panel 106a. The input of a left scroll is an operation of scrolling an image to the left and corresponds to a scroll instruction in a leftward direction. The input of a left scroll is, for example, a touch-move that moves to the left or an operation of sliding a scroll bar (not illustrated) toward the right. When a left scroll is input, the CPU 101 advances to S405, but in a case where a left scroll is not input, the CPU 101 advances to S407.

In S405, when the CPU 101 receives an input of a left scroll from the user, the CPU 101 scrolls (slides) the image toward the left. The CPU 101 sequentially displays an image region of the display 105 corresponding to a leftward scroll amount in accordance with the scroll from a right end of the display 105 toward the left. It should be noted that a position of the clipping region frame 606 on the screen is fixed and the position is not scrolled even when a scroll is input.

In S406, the CPU 101 displays a region on a rightward direction side excluding an image region on a left side corresponding to the scroll amount by moving the region leftward by the scroll amount. In other words, the CPU 101 scrolls the VR content displayed by flat display in the rectangular region of the display 105 leftward. In addition, in accordance with the scroll, the CPU 101 sequentially displays an image region corresponding to the leftward scroll amount in the VR content from a rightward end in an opposite direction to the leftward direction toward the left in the rectangular region.

Figure 8A:
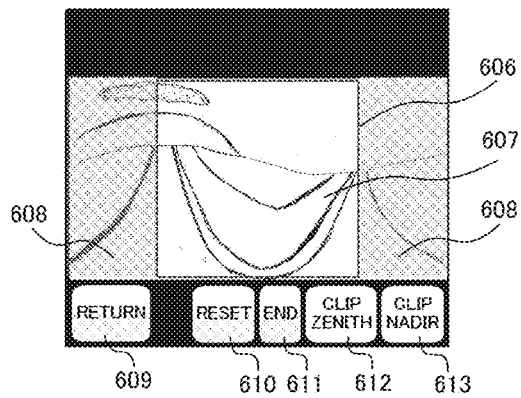
FIGS. 8A to 8E represent display examples when changing a clipping direction by a left scroll.
Figure 8B:
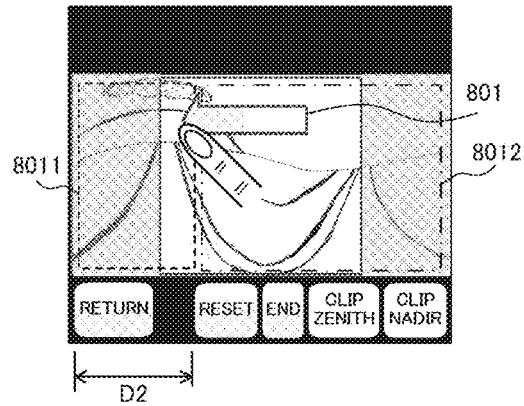

FIGS. 8A to 8E show a display example in accordance with the scrolls performed in S402 and S403. A left scroll 801 shown in FIG. 8B represents a scroll input in a leftward direction with respect to FIG. 8A. When the left scroll 801 is input, the processes of S405 and S406 shown in FIG. 4 are executed. For example, let us assume that, in S404, the user has scrolled contrary to FIG. 7B toward the left end side of the display 105 by a scroll amount D2. In S405, the CPU 101 sequentially displays an image region 8011 which is enclosed by a dotted line and which corresponds to the scroll amount (D2) from the right end of the display 105 toward the left. Next, in S406, the CPU 101 displays a left-side region 8012 enclosed by a dashed-dotted line and excluding the image region 8011 corresponding to the scroll amount (D2) by moving the region 8012 leftward by the scroll amount (D2). Once the processes are executed, the display 105 changes to the state shown in FIG. 8C. A button operation of selecting a clipping determination (completion) button 611 by the user causes a clipping region 802 enclosed by the clipping region frame 606 to be set as the clipping region.

Figure 8C:
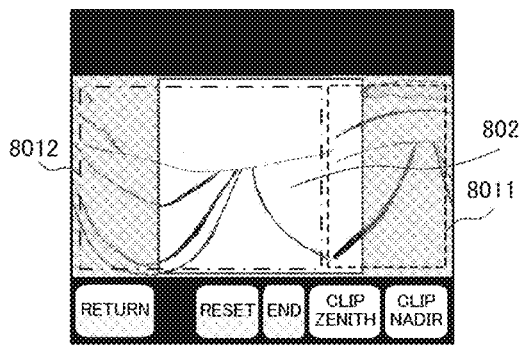
Figure 8D:
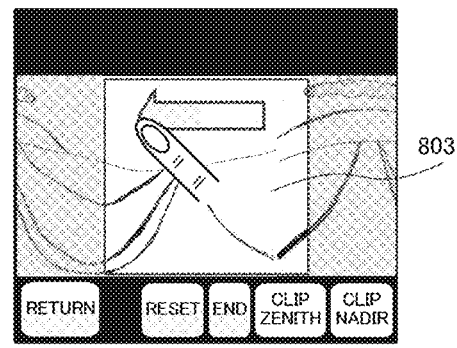
Figure 8E:
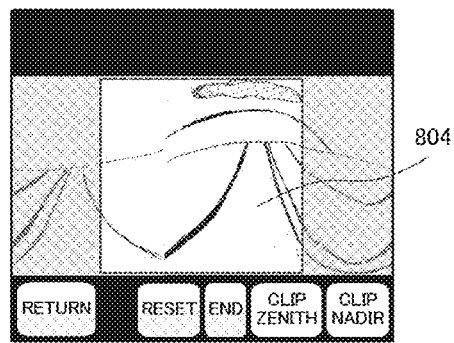

A left scroll 803 shown in FIG. 8D represents a scroll input in a leftward direction with respect to FIG. 8C. When the left scroll 803 is input, the processes of S405 and S406 shown in FIG. 4 are executed in a similar manner to when the left scroll 801 was input, and the display 105 changes to the state shown in FIG. 8E. A button operation of selecting a clipping determination (completion) button 611 by the user causes a clipping region 804 enclosed by the clipping region frame 606 to be set as the clipping region.

As described above, when the scrolls performed in S404 and S405 involve scrolling an image to the left, a portion which is scrolled all the way to outside of a left-side display region and which disappears is displayed so as to successively enter the display region from a right end thereof toward the left. In addition, an endless scroll can be realized without reaching an end by repetitively inputting left scrolls. In other words, a cyclical scroll display of a same content which does not make the user aware of boundaries such as left and right ends of the VR image 601 can be realized. Accordingly, a portion positioned at an end of the display region in the display example shown in FIG. 6A can now be positioned at the center of the clipping region frame 606. In addition, an instruction to make a seamless 180-degree region centered on the position (a range with a circumference of 90 degrees which is centered on the position) the VR image after clipping can be issued.

In S407, the CPU 101 determines whether or not a touch operation with respect to a reset button 610 has been performed or, in other words, whether or not an operation of a reset instruction of a clipping direction has been accepted. When a reset instruction has been issued, the CPU 101 advances to S408, but in a case where a reset instruction has not been issued, the CPU 101 advances to S409. A reset clipping direction position is a setting of the clipping direction set during the process of S304 shown in FIG. 3. In S408, the CPU 101 sets the clipping direction to an initial position.

In S409, the CPU 101 determines whether or not a touch operation with respect to the clipping determination button 611 has been performed or, in other words, whether or not an operation of a determination instruction of a clipping direction has been accepted. When a determination instruction of a clipping direction has been issued, the CPU 101 ends the process, but in a case where a determination instruction of a clipping direction has not been issued, the CPU 101 proceeds to S401. It is assumed that, in a case where a determination of Yes is made in S409, a determination of Yes is also made in S308. In other words, in the present embodiment, the determination instruction of a clipping direction and the clipping instruction are the same instruction. However, the determination instruction of a clipping direction and the clipping instruction may be configured so as to be performed by separate operations. For example, a preview display indicating a range of the VR image after clipping may be performed in response to an issuance of the determination instruction of a clipping direction and, subsequently, an image file of the clipped VR image may be generated in accordance with an issuance of the clipping instruction.

It should be noted that an orientation of a range of the VR image after clipping among the VR image prior to the clipping can be designated by scrolls in the horizontal direction described in S401 to S406. An elevation/depression angle of the VR image after clipping is fixed to a range from zenith to nadir with an elevation/depression angle of 180 degrees centered on the horizontal direction (a direction 90 degrees from zenith: after zenith correction, a direction 90 degrees from the zenith after correction). Accordingly, the hassle of designating a clipping range can be prevented. In addition, the VR image after clipping can be set to 180 degrees centered on front (the horizontal direction) from the point of view of the user viewing the VR image and configured such that a rear-side range beyond zenith or a rear-side range beyond nadir is not included in the VR image. Accordingly, viewing in uncomfortable postures when the VR image is viewed in a VR view such as arching backward to look back can be prevented.

When the zenith clipping button 612 is touched, the clipping range is set to a range of 90 degrees in all directions centered on zenith (after zenith correction, a direction 90 degrees from the zenith after correction) regardless of a range indicated by the clipping region frame 606 (an orientation designated by the user). This represents an upper hemispherical range when a virtual sphere is equally vertically divided. In addition, when the nadir clipping button 613 is touched, the clipping range is set to a range of 90 degrees in all directions centered on nadir (after zenith correction, a direction 90 degrees from the nadir after correction) regardless of a range indicated by the clipping region frame 606 (an orientation designated by the user). This represents a lower hemispherical range when a virtual sphere is equally vertically divided. When the zenith clipping button 612 or the nadir clipping button 613 is touched, it is assumed that a clipping instruction has also been issued and processes up to generation of a file of the clipped VR image in S309 shown in FIG. 3 are performed. Accordingly, unnatural clipping which generates a hemisphere resulting from diagonally cutting the virtual sphere prior to the clipping or the like can be prevented. In other words, a VR image after clipping which provides a panoramic view of the entire sky above the horizon or a VR image after clipping which provides a panoramic view of an entire room as seen from the ceiling or a panoramic view of all of the dishes on a table as seen from above the table can be readily generated.

Figure 5:
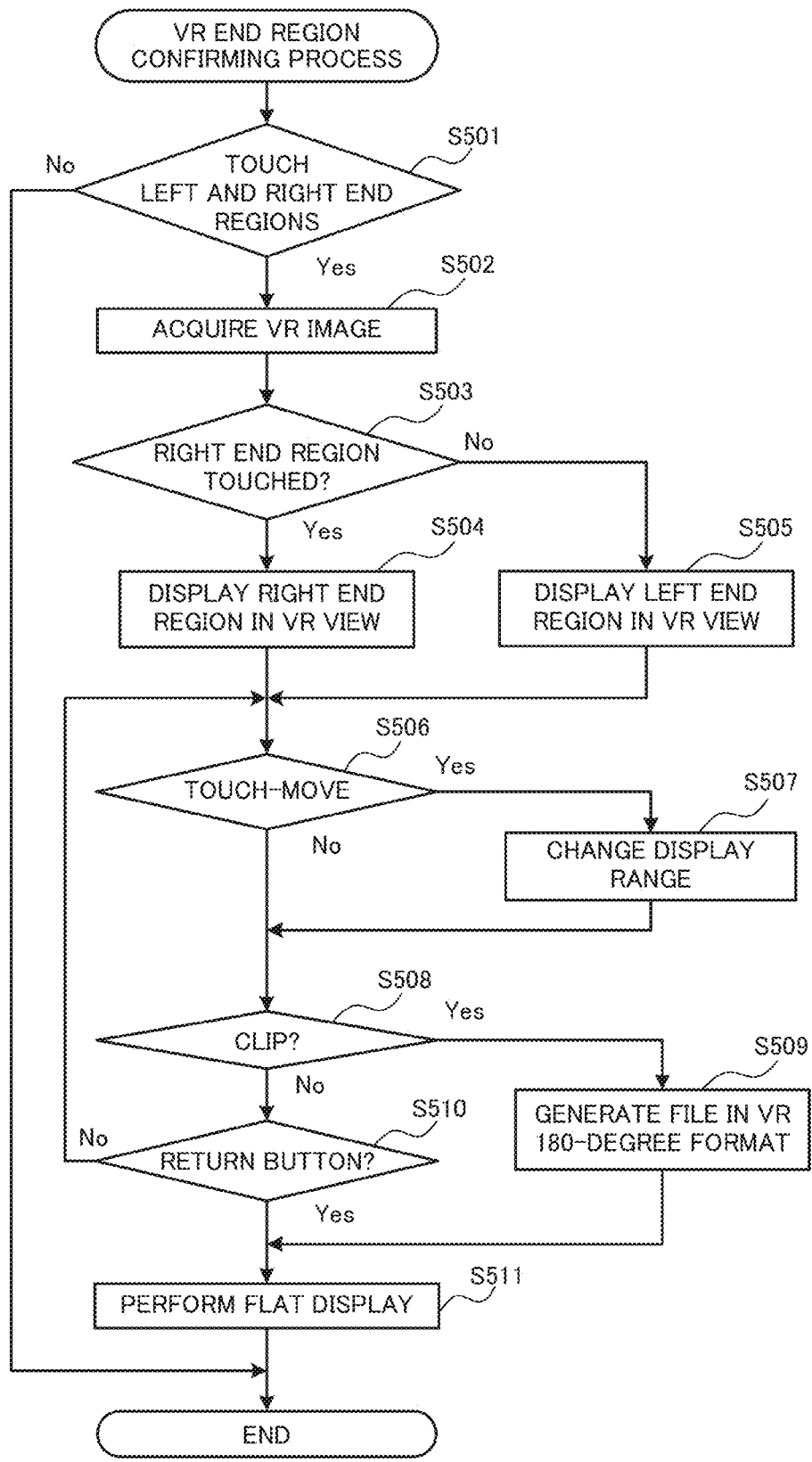
FIG. 5 is a flow chart showing an end region confirming process in VR display.

FIG. 5 is a flow chart showing an example of the VR end region confirming process of S307 shown in FIG. 3. The VR end region confirming process is realized as the CPU 101 deploys a program stored in the nonvolatile memory 103 on the memory 102 and executes the program. The VR end region confirming process is a process of enabling the user to confirm end regions of a VR image to be clipped by performing VR display of boundaries of a region to be clipped and regions including such boundaries.

In S501, the CPU 101 determines whether or not left and right end regions of the clipping region 607 instead of the center region described earlier among a display region of the VR image being displayed has been touched as a confirmation instruction of an end of a clipping range. The left and right end regions refer to a region (a left end region) within a predetermined width from a left side including a left side of the clipping region frame 606 and a region (a right end region) within a predetermined width from a right side including a right side of the clipping region frame 606 which are left and right boundaries of the clipping region 607. When the left and right end regions have been touched, the CPU 101 advances to S502, but in a case where the left and right end regions have not been touched, the CPU 101 ends the process. The confirmation instruction of an end of a clipping range is not limited thereto. For example, an icon for issuing the confirmation instruction of an end of a clipping range may be displayed and the icon may be touched to issue the confirmation instruction of an end of a clipping range. Alternatively, a side to the left of the left side of the clipping region frame 606 or a side to the right of the right side of the clipping region frame 606 among the display region of the VR image being displayed may be touched to issue the confirmation instruction of an end of a clipping range.

In S502, the CPU 101 reads the VR image acquired in S301. In addition, the CPU 101 acquires information indicating a video range (a valid video range) to be attached as attribute information of the VR image. The information indicating a valid video range refers to information describing angular ranges in the vertical direction and in the horizontal direction of a valid video included in the VR image. The information indicating a valid video range may be information that enables a valid video range of the VR image to be specified and may be an angle of view, a viewing angle, an azimuth, an elevation, the numbers of horizontal pixels, or positional information such as coordinates. Alternatively, the information indicating a valid video range may be model information of the camera used to capture the VR image (a photographable range can be specified by specifying a model), information on zoom during photography, and the like.

When the CPU 101 acquires the information indicating a valid video range, the CPU 101 also identifies (calculates) an invalid video range (a non-video range) based on differences from vertical and horizontal 360 degrees. Conversely, information indicating an invalid video range may be acquired from the attribute information of the VR image and a valid video range may be calculated from the information indicating the invalid video range, or both information indicating a valid video range and information indicating an invalid video range may be acquired from the attribute information of the VR image.

In S503, the CPU 101 determines whether or not the right end region described earlier has been touched. When the right end region has been touched, the CPU 101 advances to S504, but in a case where the right end region has not been touched, the CPU 101 advances to S505.

In S504, the CPU 101 performs a display process of the right end region of the VR image acquired in S502 on the basis of a display range within the range of the clipping region frame 606 among the VR image. Original data (an original image) of the VR image is an image which is distorted due to the use of, for example, equidistant cylindrical projection, and which is an image in a format that enables a position of each pixel to be associated with coordinates on a surface of a sphere. The original image of the VR image is mapped onto a sphere, and a part of the sphere is clipped and displayed. In other words, the image displayed in S504 is an image obtained by clipping and enlarging a part of the VR image and is an image in which distortion of the original image has been removed (or reduced). In this case, the CPU 101 sets a valid range of the displayed VR image to a range of orientations of 90 degrees to both the left and the right of a center on a center line of a region enclosed by the clipping region frame 606 (a total of 180 degrees) and to a range of an elevation/depression angle from zenith to nadir. The CPU 101 sets other ranges as outside the valid range (invalid ranges, excluded ranges that are outside of the clipping range). By displaying the right-side end region so as to be centered on a boundary line between the valid range and the invalid range, the CPU 101 enables a state of an end on the boundary line between the right-side valid range and the invalid range to be confirmed.

In S505, the CPU 101 performs a display process of the left end region of the VR image acquired in S502 on the basis of a display range within the range of the clipping region frame 606 among the VR image. A same display method as that in S504 is used. In this case, by displaying the left end region so as to be centered on a boundary line between the valid range and the invalid range, the CPU 101 enables a state of an end on the boundary line between the left-side valid range and the invalid range to be confirmed.

In S506, on the basis of information notified from the touch panel 106a, the CPU 101 determines whether or not a touch-move has been detected. When a touch-move has been detected, the CPU 101 advances to S507, but in a case where a touch-move has not been detected, the CPU 101 advances to S508.

In S507, the CPU 101 changes the display range of the VR image in accordance with a direction of a slide operation by the touch-move (a direction of the touch-move). For example, when it is determined that the direction of the touch-move is a leftward direction, by shifting (sliding) the display range of the VR image leftward by an amount corresponding to the touch-move, the user can perform the operation while experiencing an operation feeling as though moving the entire VR image. At this point, a display position on the display 105 of a region outside of the clipping range is fixed. Therefore, a relative relationship between the region outside of the clipping range and the displayed range to be inside the clipping range is shifted by the touch-move and a clipping range (a clipping direction) with respect to the VR image prior to the clipping is changed. In this manner, the clipping range can be set by finely adjusting an extent of a region to be fitted into the clipping range while confirming the boundary of the clipping range.

In S508, the CPU 101 determines whether or not an operation for a clipping instruction has been performed with respect to the touch panel 106a. When a clipping instruction has been issued, the CPU 101 advances to S509, but in a case where a clipping instruction has not been issued, the CPU 101 advances the process to S510.

In S509, the CPU 101 clips an image in a range of 180 degrees in the clipping direction set in S508 and saves the image in a VR 180-degree format in the recording medium 108. The generated image is the same as that described in S309.

In S510, on the basis of information notified from the touch panel 106a the CPU 101 determines whether or not a return instruction has been issued by a touch operation on a return button. When a return instruction has been issued, the CPU 101 advances the process to S511, but in a case where a return instruction has not been issued, the CPU 101 returns the process to S506.

In S511, the CPU 101 reads the VR image acquired in S502, acquires information indicating a video range (a valid video range) attached as attribute information of the VR image, and displays the VR image by flat display in which the valid video range is fitted into a rectangle. When the display range has been changed in S507, a center position of the image to be displayed by flat display is set on the basis of information on the center of the display range after the change. After display, the CPU 101 ends the VR end region confirming process.

End confirmation display of the VR end region confirming process will now be described with reference to FIGS. 9A and 9B. This display is the display performed in S504 and S505 shown in FIG. 5.

Figure 9A:
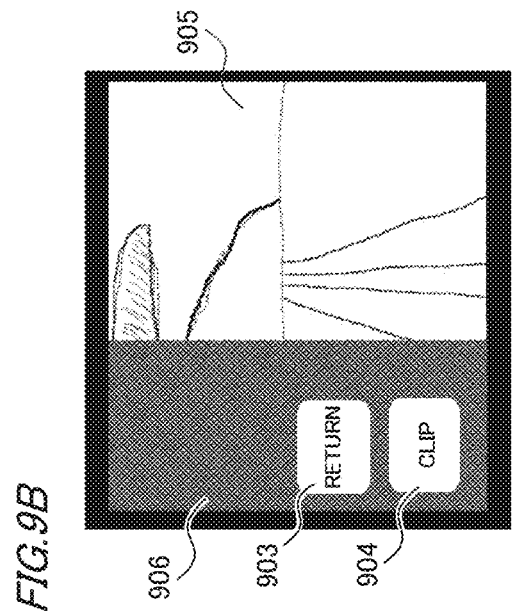
FIGS. 9A and 9B represent display examples of an end region confirmation method in VR display.

FIG. 9A is a diagram showing a state where a right end side is displayed when VR display of a VR image is performed. FIG. 9A is displayed by, for example, touching a position above a frame on the right side of the clipping region frame 606 or touching the right-side non-clipping region 608 shown in FIG. 6C. Touching a position above the frame on the right side of the clipping region frame 606 or touching the right-side non-clipping region 608 is an example of the "confirmation instruction" by the user. A confirmation instruction is an operation of designating a boundary or a region including the boundary to be a confirmation object in a region enclosed by the clipping region frame 606. A right-side valid range 901 and an invalid range 902 are displayed by VR display (a VR view). VR display (a VR view) is a display mode which is mapped onto a virtual sphere and which has been deformed from flat display. Therefore, a distorted portion in flat display can be accurately confirmed in a shape where the distortion has been corrected. The invalid range 902 may be displayed while being masked by black, white, or a pattern display. Displaying a boundary at approximately center enables a state of the right-side boundary line of the VR image to be confirmed. Arranging a return button 903 and a clipping button 904 on the invalid range 902 enables the user to confirm a region including the right-side valid range 901 and the right-side boundary line of the VR image and to identify boundaries.

Figure 9B:
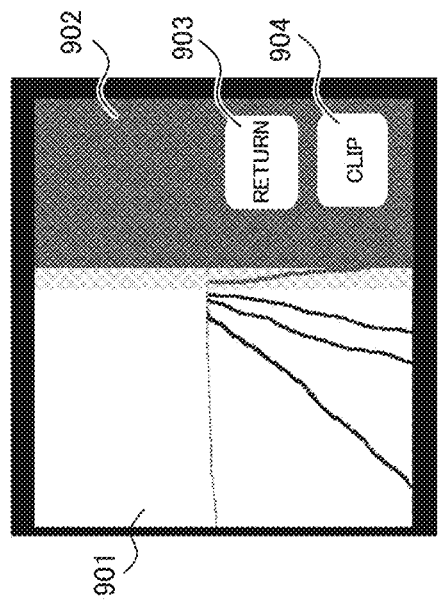

FIG. 9B is a diagram showing a state where a left end side is displayed when VR display of a VR image is performed. FIG. 9B is displayed by, for example, touching a position above a frame on the left side of the clipping region frame 606 or touching the left-side non-clipping region 608 (a confirmation instruction) shown in FIG. 6C. A left-side valid range 905 and an invalid range 906 are displayed by VR display. The invalid range 906 may be displayed while being masked by black, white, or a pattern display. Displaying a boundary at approximately center enables a state of the left-side boundary line of the VR image to be confirmed. In a similar manner to FIG. 9A, arranging the return button 903 and the clipping button 904 on the invalid range 906 enables the user to confirm a region including the left-side valid range 905 and the left-side boundary line of the VR image and to identify boundaries.

While an example where a position above a frame of the clipping region frame 606 or the non-clipping region 608 is touched as a confirmation instruction from the user has been demonstrated, a confirmation instruction is not limited thereto. For example, the CPU 101 may display an icon for designating a boundary to be a confirmation object in a region enclosed by the frames of the clipping region frame 606 on the touch panel 106a. By touching the icon, the user can confirm a region including the boundary on a screen shown in FIG. 9A or 9B and identify the boundary. The screen shown in FIG. 9A or 9B represents virtual information that is displayed for the purpose of having the user confirm information on a boundary and identify the boundary.

According to the embodiment described above, when performing 180-degree clipping of a VR image from flat display, a direction of an image end on the flat display can be set to a center region after the clipping.

In addition, in a case where the VR image is not in a clipping editing state, user operability can also be improved by feeding an image with left and right scrolls.

It should be noted that the various controls described above as controls to be performed by the CPU 101 may be carried out by one piece of hardware or a plurality of pieces of hardware (for example, a plurality of processors or circuits) may control an entire apparatus by sharing processes.

In addition, while the present invention has been described in detail on the basis of a preferred embodiment thereof, it is to be understood that the present invention is not limited to the specific embodiment and various modes that does not constitute departures from the scope of the invention are also included in the present invention. Furthermore, the embodiment described above simply represents an example of the present invention and the embodiment can also be combined with other embodiments.

Moreover, while an example in which the present invention is applied to a smartphone has been described in the embodiment presented above, the present invention is not limited to this example and can be applied to any apparatus capable of displaying a VR image on a display unit. For example, the present invention can be applied to a personal computer, a PDA, a mobile phone terminal, a mobile image viewer, a printer apparatus equipped with a display, a digital photo frame, a music player, a game device, an electronic book reader, a video player, and the like. The present invention can also be applied to a digital camera, a television apparatus, a projection apparatus, a tablet terminal, an AI speaker, a domestic electrical appliance, a vehicle-mounted apparatus, medical equipment, and the like.

When clipping a VR image with a narrower range from a VR image on flat display, a region near a screen end of the flat display can be designated as a clipping center.

According to the embodiment described above, the following configurations are disclosed. Specifically, (A1) An electronic device including:

a display controlling unit configured to control so that flat display involving fitting a first video range of a VR content into a rectangle is performed on a first screen and an indicator indicating a region to be clipped from the VR content is displayed on the VR content being displayed by flat display in a rectangular region on a second screen;

a switching unit configured to switch the first screen to the second screen in accordance with a setting instruction of a clipping range from a user;

a control unit configured to control so that cyclical scroll display of a same content is performed on the second screen, the cyclical scroll display involving, in accordance with a first operation, scrolling the VR content being displayed by flat display in a first direction without scrolling the indicator and, in accordance with the scrolling of the VR content, sequentially displaying, in the first direction from an end in a second direction that is an opposite direction to the first direction in the rectangular region, an image region corresponding to a scroll amount in the first direction among the VR content, and that the cyclical scroll display is not performed on the first screen even when the first operation is performed: and a generating unit configured to generate an edited VR content including a second video range that is narrower than the first video range among the VR content on the basis of a region indicated by the indicator on the second screen.

(A2) The electronic device according to (A1), wherein the control unit causes a center of a range indicated by the indicator in the VR content being displayed by flat display and a center of the second video range to coincide or approximately coincide with each other.

(A3) The electronic device according to (A1) or (A2), wherein the indicator indicates a range that is narrower than the rectangular region.

(A4) The electronic device according to any one of (A1) to (A3), wherein the first direction is a rightward direction or a leftward direction relative to the VR content.

(A5) The electronic device according to any one of (A1) to (A4), wherein an orientation of the second video range changes in a case where the first video range is mapped onto a virtual sphere in accordance with the cyclical scroll display in the first direction on the second screen.

(A6) The electronic device according to any one of (A1) to (A5), wherein the control unit does not perform a scroll in a third direction that is perpendicular to the first direction on the second screen.

(A7) The electronic device according to any one of (A1) to (A6), wherein an elevation or a depression angle of the second video range is not changed in a case where the first video range is mapped onto a virtual sphere in accordance with a scroll of the VR content on the second screen.

(A8) The electronic device according to any one of (A1) to (A7), wherein the first operation is a slide operation involving touching the rectangular region and moving the touch position in the first direction.

(A9) The electronic device according to any one of (A1) to (A8), wherein when the setting instruction is accepted from the user, the control unit confirms with the user as to whether or not zenith correction is to be performed.

(A10) The electronic device according to any one of (A1) to (A9), wherein the control unit accepts an instruction to perform clipping centered on a zenith or clipping centered on a nadir of the VR content by an operation that does not involve a scroll operation.

(A11) The electronic device according to any one of (A1) to (A10) further including:

a recording unit configured to generate and record a file storing the edited VR content generated by the generating unit.

(A12) The electronic device according to (A11), wherein the recording unit generates one still image file storing a plurality of images on the basis of the second video range.

(A13) The electronic device according to (A12), wherein a character string ".vr" is described before an extension in a file name of the still image file.

(A14) The electronic device according to any one of (A11) to (A13), wherein the recording unit generates one moving image file in which a plurality of moving images on the basis of the second video range are arranged.

(A15) The electronic device according to (A14), wherein a character string ".vr" is described before an extension in a file name of the moving image file.

(A16) A control method of an electronic device, including the steps of:

controlling so that flat display involving fitting a first video range of a VR content into a rectangle is performed on a first screen and an indicator indicating a region to be clipped from the VR content is displayed on the VR content being displayed by flat display in a rectangular region on a second screen;

switching the first screen to the second screen in accordance with a setting instruction of a clipping range from a user:

controlling so that cyclical scroll display of a same content is performed on the second screen, the cyclical scroll display involving, in accordance with a first operation, scrolling the VR content being displayed by flat display in a first direction without scrolling the indicator and, in accordance with the scrolling of the VR content, sequentially displaying, in the first direction from an end in a second direction that is an opposite direction to the first direction in the rectangular region, an image region corresponding to a scroll amount in the first direction among the VR content, and that the cyclical scroll display is not performed on the first screen even when the first operation is performed: and generating an edited VR content including a second video range that is narrower than the first video range among the VR content on the basis of a region indicated by the indicator on the second screen.

(A17) A program which causes a computer to function as the respective units of the electronic device according to any one of (A1) to (A15).

(A18) A computer-readable storage medium storing a program which causes a computer to function as the respective units of the electronic device according to any one of (A1) to (A15).

When clipping a 180-degree clipping region from a VR image, a user can panoramically view the entire VR image by performing flat display in which a 360-degree valid video range is fitted into a rectangle. However, in case of designating a partial range such as a 180-degree clipping region in the state of flat display, there is a problem in that it is difficult to designate an end region on the flat display as a clipping center. In particular, there is a problem in that, in case of desiring to confirm a state of a screen end to be actually clipped, it is difficult to confirm the state prior to the clipping. In consideration of such problems, the embodiment described above also discloses the following configurations so that a state of an end of a partial range displayed on a flat display of a VR image can be confirmed more accurately. Specifically, (B1) An electronic device including:

a display controlling unit configured to perform flat display involving fitting a first video range of a VR content into a rectangle and which displays an indicator indicating a region to be clipped from the VR content being subjected to the flat display; an accepting unit configured to accept, from a user, a confirmation instruction of a boundary of a second video range that is narrower than the first video range on the basis of the region; and a boundary display configured to control so that, in accordance with the confirmation instruction, a range including the boundary of the second video range among the omnidirectional VR content is displayed in a second display mode having been deformed from the flat display in such a manner that the boundary can be identified.

(B2) The electronic device according to (B1), wherein
the second display mode is a display mode involving displaying by mapping on a virtual sphere.

(B3) The electronic device according to (B1) or (B2), wherein
the accepting unit accepts a clipping instruction to clip the second video range, and
the electronic device further includes a generating unit configured to generate, in accordance with the clipping instruction, an edited VR content including the second video range.

(B4) The electronic device according to (B3), further including a recording unit configured to generate and record a file storing the edited VR content generated by the generating unit.

(B5) The electronic device according to (B4), wherein
the recording unit generates one still image file storing a plurality of images on the basis of the second video range.

(B6) The electronic device according to (B5), wherein
a character string ".vr" is described before an extension in a file name of the still image file.

(B7) The electronic device according to any one of (B4) to (B6), wherein
the recording unit generates one moving image file in which a plurality of moving images on the basis of the second video range are arranged.

(B8) The electronic device according to (B7), wherein
a character string ".vr" is described before an extension in a file name of the moving image file.

(B9) The electronic device according to any one of (B1) to (B8), wherein
the confirmation instruction is an operation by a user of designating a boundary to be a confirmation object in the region enclosed by the indicator.

(B10) The electronic device according to any one of (B1) to (B9), wherein
the boundary display unit displays a range which includes a boundary of the second video range among the VR content and which is narrower than the second video range.

(B11) A control method of an electronic device, including the steps of:
performing flat display involving fitting a first video range of a VR content into a rectangle and displaying an indicator indicating a region to be clipped from the VR content being subjected to the flat display;
accepting, from a user, a confirmation instruction of a boundary of a second video range that is narrower than the first video range on the basis of the region: and
controlling so that, in accordance with the confirmation instruction, a range including the boundary of the second video range among the omnidirectional VR content is displayed in a second display mode having been deformed from the flat display in such a manner that the boundary can be identified.

(B12) A program which causes a computer to function as the respective units of the electronic device according to any one of (B1) to (B10).

(B13) A computer-readable storage medium storing a program which causes a computer to function as the respective units of the electronic device according to any one of (B1) to (B10).

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-248299, filed on Dec. 28, 2018, Japanese Patent Application No. 2018-248283, filed on Dec. 28, 2018, which is hereby incorporated by reference herein in its entirety.

What is claimed is:

1. An electronic device comprising:
at least one memory and at least one processor which function as:
a display controlling unit configured to control so that flat display involving fitting a first video range of a VR content into a rectangle is performed on a first screen and an indicator indicating a region to be clipped from the VR content is displayed on the VR content being displayed by flat display in a rectangular region on a second screen;
a switching unit configured to switch the first screen to the second screen in accordance with a setting instruction of a clipping range from a user;
a control unit configured to control so that
cyclical scroll display of a same content is performed on the second screen, the cyclical scroll display involving, in accordance with a first operation, scrolling the VR content being displayed by flat display in a first direction without scrolling the indicator and, in accordance with the scrolling of the VR content, sequentially displaying, in the first direction from an end in a second direction that is an opposite direction to the first direction in the rectangular region, an image region corresponding to a scroll amount in the first direction among the VR content, and that the cyclical scroll display is not performed on the first screen even when the first operation is performed; and a generating unit configured to generate an edited VR content including a second video range that is narrower than the first video range among the VR content on the basis of a region indicated by the indicator on the second screen.

2. The electronic device according to claim 1, wherein the control unit causes a center of a range indicated by the indicator in the VR content being displayed by flat display and a center of the second video range to coincide or approximately coincide with each other.

3. The electronic device according to claim 1, wherein the indicator indicates a range that is narrower than the rectangular region.

4. The electronic device according to claim 1, wherein the first direction is a rightward direction or a leftward direction relative to the VR content.

5. The electronic device according to claim 1, wherein an orientation of the second video range changes in a case where the first video range is mapped onto a virtual sphere in accordance with the cyclical scroll display in the first direction on the second screen.

6. The electronic device according to claim 1, wherein the control unit does not perform a scroll in a third direction that is perpendicular to the first direction on the second screen.

7. The electronic device according to claim 1, wherein an elevation or a depression angle of the second video range is not changed in a case where the first video range is mapped onto a virtual sphere in accordance with a scroll of the VR content on the second screen.

8. The electronic device according to claim 1, wherein the first operation is a slide operation involving touching the rectangular region and moving the touch position in the first direction.

9. The electronic device according to claim 1, wherein in a case where the setting instruction is accepted from the user, the control unit confirms with the user as to whether or not zenith correction is to be performed.

10. The electronic device according to claim 1, wherein the control unit accepts an instruction to perform clipping centered on a zenith or clipping centered on a nadir of the VR content by an operation that does not involve a scroll operation.

11. The electronic device according to claim 1, wherein the at least one memory and at least one processor further function as:

a recording unit configured to generate and record a file storing the edited VR content generated by the generating unit.

12. The electronic device according to claim 11, wherein the recording unit generates one still image file storing a plurality of images on the basis of the second video range.

13. The electronic device according to claim 12, wherein a character string ".vr" is described before an extension in a file name of the still image file.

14. The electronic device according to claim 11, wherein the recording unit generates one moving image file in which a plurality of moving images on the basis of the second video range are arranged.

15. The electronic device according to claim 14, wherein a character string ".vr" is described before an extension in a file name of the moving image file.

16. A control method of an electronic device, comprising the steps of:

controlling so that flat display involving fitting a first video range of a VR content into a rectangle is performed on a first screen and an indicator indicating a region to be clipped from the VR content is displayed on the VR content being displayed by flat display in a rectangular region on a second screen;

switching the first screen to the second screen in accordance with a setting instruction of a clipping range from a user;

controlling so that cyclical scroll display of a same content is performed on the second screen, the cyclical scroll display involving, in accordance with a first operation, scrolling the VR content being displayed by flat display in a first direction without scrolling the indicator and, in accordance with the scrolling of the VR content, sequentially displaying, in the first direction from an end in a second direction that is an opposite direction to the first direction in the rectangular region, an image region corresponding to a scroll amount in the first direction among the VR content, and that the cyclical scroll display is not performed on the first screen even when the first operation is performed; and generating an edited VR content including a second video range that is narrower than the first video range among the VR content on the basis of a region indicated by the indicator on the second screen.

17. A non-transitory computer readable medium that stores a program, wherein the program causes a computer to execute the steps of:

controlling so that flat display involving fitting a first video range of a VR content into a rectangle is performed on a first screen and an indicator indicating a region to be clipped from the VR content is displayed on the VR content being displayed by flat display in a rectangular region on a second screen;

switching the first screen to the second screen in accordance with a setting instruction of a clipping range from a user;

controlling so that cyclical scroll display of a same content is performed on the second screen, the cyclical scroll display involving, in accordance with a first operation, scrolling the VR content being displayed by flat display in a first direction without scrolling the indicator and, in accordance with the scrolling of the VR content, sequentially displaying, in the first direction from an end in a second direction that is an opposite direction to the first direction in the rectangular region, an image region corresponding to a scroll amount in the first direction among the VR content, and that the cyclical scroll display is not performed on the first screen even when the first operation is performed; and generating an edited VR content including a second video range that is narrower than the first video range among the VR content on the basis of a region indicated by the indicator on the second screen.

* * * * *